United States Patent [19]

Wuerker et al.

[11] 3,818,372

[45] June 18, 1974

[54] MULTIFREQUENCY LASER OSCILLATOR FOR HOLOGRAPHIC CONTOURING

[75] Inventors: Ralph F. Wuerker, Palos Verdes Estates; Lee O. Heelinger, Torrance, both of Calif.

[73] Assignee: TRW Inc., Redondo Beach, Calif.

[22] Filed: Nov. 30, 1972

[21] Appl. No.: 310,858

[52] U.S. Cl. .......................................... 331/94.5 M
[51] Int. Cl. ............................................ H01b 3/10
[58] Field of Search.................... 331/94.5; 350/3.5; 356/109

[56] References Cited
UNITED STATES PATENTS 3,603,685 9/1971 Heflinger et al. ................... 350/3.5
3,638,139 1/1972 Ashkin et al. ...................... 331/94.5

Primary Examiner—William L. Sikes
Attorney, Agent, or Firm—Daniel T. Anderson; Donald R. Nyhagen; Edwin A. Oser

[57] ABSTRACT

A multifrequency laser oscillator which generates coherent light of two closely adjacent optical frequencies in rapid succession for recording contour holograms by the double exposure technique. The two light frequencies are selected by a pair of frequency selecting reflectors at one end of the oscillator resonator cavity. At least one of these reflectors is movable between an active position where it reflects the laser beam to select one light frequency and an inactive position where the other reflector reflects the beam to select the other light frequency. The described laser oscillators have a ruby lasing medium and generate coherent light at the $R_1$ and $R_2$ wavelengths of the ruby resonant fluorescence.

6 Claims, 2 Drawing Figures

PATENTED JUN 18 1974 3,818,372

MULTIFREQUENCY LASER OSCILLATOR FOR HOLOGRAPHIC CONTOURING

RELATED APPLICATIONS

The present U.S. Patent application is related to co-pending applications of Ralph F. Wuerker and Lee O. Heflinger, filed concurrently with Ser. No. 310,859, entitled "Multifrequency Laser Oscillator for Holographic Contouring" and Ser. No. 310,867, entitled "Polarized Multifrequency Laser Oscillator for Holographic Contouring" and assigned to TRW Inc.

BACKGROUND OF THE INVENTION

1. Field of the Invention

This invention relates generally to the field of holography and more particularly to a novel multifrequency laser oscillator which generates coherent light of two closely adjacent optical frequencies in rapid succession of recording contour holograms by the double exposure technique.

2. Prior Art

As is well known to those versed in the art of holography, holographic contouring involves recording a hologram of an object in such a way that the holographic image reconstructed from the hologram displays dark contour lines or bands, commonly referred to as contour fringes, from which the surface contour of the object may be determined with relatively high accuracy. The basic underlying principles of holographic contouring and the mechanics of implementing these principles are known and described in the open literature. For example, the basic principles of holographic contouring and holographic contouring apparatus are described in U.S. Pats. Nos. 3,603,684 and 3,603,685. Accordingly, it is unnecessary to elaborate on the basic principles of contouring in this disclosure.

Suffice it to say that holographic contouring involves holographically recording an object at two different coherent light frequencies and hence wavelengths on a single holographic recording medium. The recordings produced by the two frequencies create an interference pattern in the reconstructed holographic image which produces the contour fringes. As discussed in the above mentioned patents, the contour fringe spacing is a function of the difference between the wavelengths of the two coherent light frequencies.

These patents also discuss the fact that a contour hologram may be recorded on a recording medium by a single exposure light simultaneously or by double exposure of the medium, i.e. exposure of the recording medium first at one coherent light frequency and then at the other light frequency. In the single exposure technique, the two light frequencies are generated simultaneously and recorded simultaneously on the recording medium. In the double exposure technique, the two light frequencies are generated and recorded separately on the recording medium. The two methods produce the same contour fringe pattern. This invention is concerned with the double exposure technique.

When utilizing the double exposure technique to record a contour hologram, it is imperative that the object being recorded remain absolutely stationary between the successive exposures; that is to say, the object must remain stationary within a fraction of a wavelength of the coherent light. Accordingly, the double exposure technique is limited in application. Moreover, even in those applications for which the double exposure technique is suitable, the time interval between the successive exposures should be as brief as possible to minimize the possibility of movement of the object between exposures.

While this requirement that the object being recorded remain absolutely stationary between exposures restricts the useful applications of the double exposure contouring technique, the latter has a compensating advantage over the single exposure technique. This advantage stems from the fact that maximum contouring accuracy, and in some cases even the creation of contour fringes, may require different reference beam angles for the two light frequencies.

The single exposure technique presents the difficult task of separating the two frequency components of the single output beam from the coherent light source to provide separate reference beams of these two frequencies, respectively, which may then be directed to the recording medium at the correct reference beam angles. The double exposure technique avoids this problem since the two coherent light frequencies are automatically separated in time, and the holographic optics may be adjusted between exposures to obtain the correct reference beam angle for each frequency.

It is significant to note in connection with this reference beam angle requirement, that if the difference between the two coherent light frequencies is sufficiently small, satisfactory contour holograms may be recorded with the same reference beam angle for both light frequencies. The present invention is described in connection with contour hologram recording utilizing the $R_1$ and $R_2$ transitions or wavelengths of the resonant fluorescence of a ruby lasing medium. The frequency difference between these transitions is not sufficiently small to permit the use of the same reference beam angle for both frequencies.

From the discussion to this point, it is apparent that the single and double exposure techniques of recording contour holograms require different types of coherent light sources. Thus, the single exposure technique requires a coherent light source capable of generating two selected optical light frequencies simultaneously. The double exposure technique, on the other hand, requires a coherent light source capable of generating the two light frequencies individually, in rapid succession. Earlier mentioned U.S. Pats. No. 3,603,684 and 3,603,685, as well as U.S. Pat. No. 3,492,600 describe coherent light sources of these two different types.

SUMMARY OF THE INVENTION

This invention provides a multifrequency coherent light source or laser oscillator which generates coherent light of two closely adjacent optical frquencies in rapid succession for recording contour holograms by the double exposure technique. To this end, the laser oscillator has an optical resonator cavity containing an active lasing medium capable of lasing at each of the two light frequencies. One end of this cavity is defined by a pair of frequency selecting reflectors which are designed to select, that is induce lasing of the medium at, the two frequencies, respectively.

At least one of these cavity end reflectors is movable between active and inactive positions. In this active position, the movable reflector is disposed to reflect the laser beam. In the inactive position of the movable reflector, the laser beam reflects from the other cavity end reflector. The two reflectors have different reflectivities such that one reflector selects one contour hologram recording frequency and the other reflector selects the other recording frequency. The movable reflector or reflectors may be rapidly shifted between active and inactive positions to effect generation of the two light frequencies in rapid succession for recording contour holograms by the double exposure technique.

The described laser oscillators have a ruby lasing medium and generate coherent light at the $R_1$ and $R_2$ transitions or wavelengths of the ruby resonant fluorescence. One frequency selecting reflector of these described oscillators is a broadband reflector which selects the $R_1$ transition. The other reflector is one, such as a spike or band pass filter or a tuned reflection etalon, which reflects substantially only light at the $R_2$ wavelength and hence selects the $R_2$ transition. As explained in U.S. Pat. No. 3,603,684, these transitions or coherent light wavelengths yield contour fringes of a useful spacing in the reconstructed holographic contour image or map. The difference between the $R_1$ and $R_2$ wavelengths is not sufficiently small to permit exposure of the recording medium at the two wavelengths with the same reference beam angle.

DESCRIPTION OF THE PREFERRED EMBODIMENTS

Figure 1:
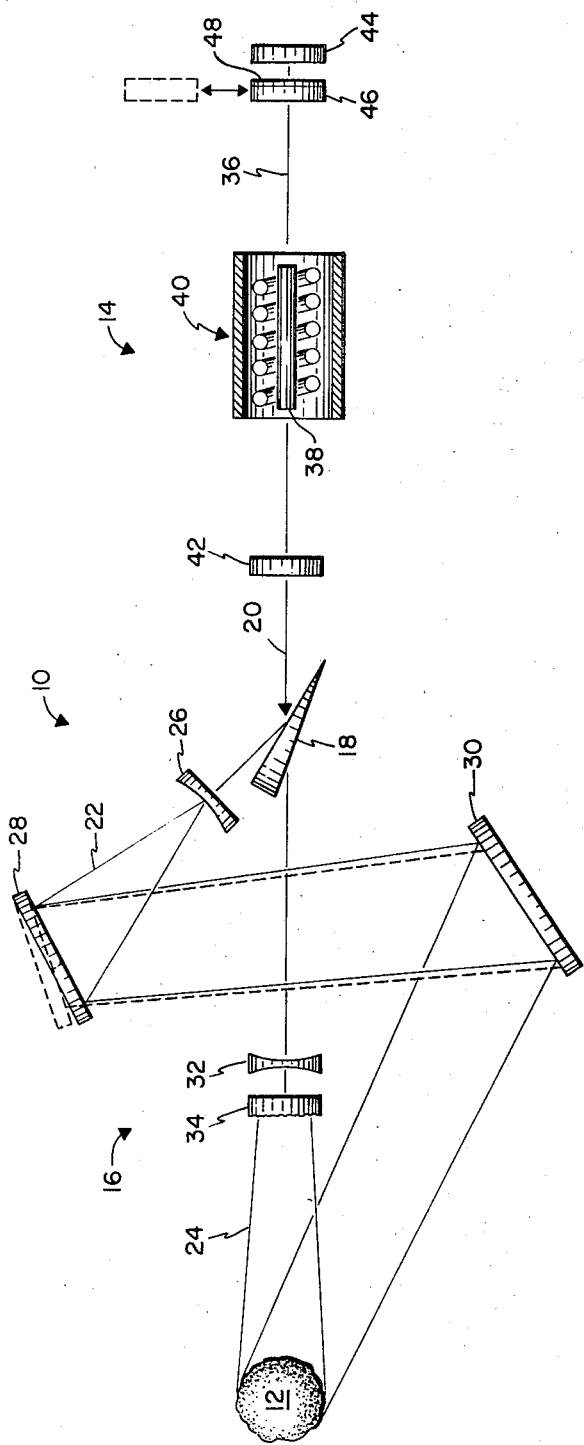
FIG. 1 illustrates a holographic contouring apparatus embodying a multifrequency laser oscillator according to the invention with one movable and one stationary frequency selecting cavity and reflector.

Referring first to FIG. 1, there is illustrated a holographic contouring apparatus 10 for recording contour holograms of an object 12. Contouring apparatus 10 includes a laser oscillator 14 according to this invention and conventional holographic optics 16. Laser oscillator 14 will be described in detail presently. Suffice it to say at this point that the laser oscillator generates coherent light of two different selected optical frequencies and wavelengths in rapid succession.

The optics 16 of the holographic contouring apparatus 10 may comprise any holographic optical arrangement suitable for recording contour holograms. The particular optics illustrated include a beam splitter 18 located in the path of the output beam 20 from the laser oscillator 14. This beam splitter splits the output beam into a reference beam 22 and a scene beam 24. The reference beam passes through a negative lens 26 to a front surface mirror 28 and is then reflected back to a light sensitive recording medium 30, such as a photographic film or plate or sheet of photochromic material. The reference beam should be enlarged by the negative lens 26 sufficiently to illuminate the entire surface of the recording medium 30 on which a contour hologram is to be recorded.

The scene beam 24 passes through negative lens 32 and diffuser 34 to the object 12 to be recorded. The negative lens 32 should enlarge the beam sufficiently to illuminate the entire portion of the object to be mapped. The diffuser preferably is so constructed that the apparent light source does not appear too large. In other words, light diffuser should preferentially scatter in the forward direction. Such a light diffuser may readily be obtained by a ground glass diffuser having a thin coating of a lacquer with substantially the same index of refraction as that of the glass of the diffuser. The light of the scene beam incident on the object 12 is scattered and reflected back to the recording medium 30.

In operation of the holographic contouring apparatus 10, the laser oscillator 14 is first operated to generate a coherent output beam 20 of one selected optical frequency and wavelength. The recording medium 30 is thereby exposed by the reference and scene beams 22, 24 of this frequency to produce a first holographic recording of the object 12 on the recording medium. Thereafter, the laser oscillator is operated to generate an output beam of another selected optical frequency and wavelength and thereby produce on the recording medium a second holographic recording of the object. The resulting double exposed holographic recording constitutes a contour hologram which may be reconstructed with a reference beam of one of the frequencies to produce a holographic contour image or map of the object 12 displaying contour fringes defining the surface contour of the object.

The basic principles of such holographic contouring were briefly explained earlier in this description and are discussed more fully in the earlier mentioned U.S. Pats. Nos. 3,603,684 and 3,603,695. Accordingly, it is unnecessary to elaborate on the matter at this point.

Laser oscillator 14 has an optical resonator cavity 36 containing an active lasing medium 38 capable of lasing at the two optical frequencies selected for recording contour holograms. Means 40 are provided for pumping the medium to cause it to lose. At the front end of the resonator cavity 36 is a partially reflecting output reflector 42. A pair of frequency selecting reflectors 44, 46 are located at the rear end of the cavity. At least one of these rear end reflectors is movable between active and inactive positions to effect reflection of the laser beam from one end then the other of these reflectors in rapid succession.

Figure 2:
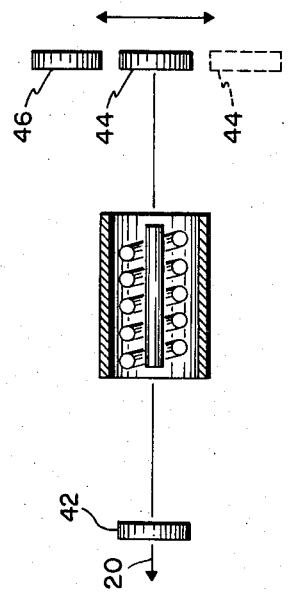
FIG. 2 illustrates a modified multifrequency laser oscillator according to the invention with two movable frequency selecting cavity end reflectors.

In FIG. 1, for example, rear reflection 44 is stationarily mounted in the path of the laser beam. Reflector 46 is movable between an inactive position out of the beam path where the reflector 44 is exposed to reflect the beam and an active position in the path in front of the stationary reflector 44 where the movable reflector is disposed to reflect the beam. In FIG. 2, both rear cavity end reflectors 44, 46 are movable to and from active positions in the beam path in such a way that either may be located in the path to reflect the laser beam. As will be explained in more detail presently, successive operation of the laser oscillator 10 at the two frequencies selected for contour hologram recording is accomplished by effecting reflection of the laser beam from the two rear end reflectors in rapid succession.

Before preceeding further with the operation of the laser oscillator, it is worthwhile to briefly discuss the lasing characteristics of a lasing medium. As is well known to those versed in the laser art and is also discussed in U.S. Pat. Nos. 3,603,684 and 3,603,685, a lasing medium has a lasing line width which represents the gain of the medium as a function of wavelength or frequency. It is also known to provide the optical cavity of a laser oscillator with mode selecting means which suppress oscillation at all but a selected frequency or selected frequencies within the lasing line width, such that the cavity has greater effective gain at the selected frequency or selected frequencies. The lasing medium will lase at the transitions or frequencies at which the combined gain of the medium and the cavity exceeds the lasing threshold of the medium. In the laser art, this mode selecting action is commonly described as selecting the lasing transitions or frequencies of the lasing medium.

The present invention utilizes the two cavity end reflectors 44, 46 to select the two lasing transitions or frequencies of the lasing medium 38 which are used to record contour holograms. These end reflectors will be described in greater detail presently. Suffice it to say here that reflector 44 has a reflectivity such that the combined gain of the lasing medium and the reflector exceed the lasing threshold of the medium only at one recording frequency, such that the medium lases at this frequency when the reflector is located in active position. Reflector 46 has a reflectivity such that the combined gain of the latter reflector and the lasing medium exceeds the lasing threshold only at the other recording frequency whereby the medium lases at this frequency when the reflector is located in active position.

These two recording frequencies are selected to yield the desired contour fringe spacing in the reconstructed holographic contour image or map. In this regard, attention is again directed to U.S. Pats. Nos. 3,603,684 and 3,603,685 which explain the relationship between recording frequency or wavelength and contour fringe spacing.

It will now be understood that when the laser oscillator 10 is operated with rear end reflector 46 in its inactive position, reflector 44 reflects the laser beam and the oscillator lases at the corresponding recording frequency to produce a first holographic recording of the object 12 on the recording medium 30. When the laser oscillator is operated with the reflector 46 in active position, the laser beam is reflected from the latter reflector and the oscillator lases at the other recording frequency to produce a second holographic recording on the recording medium. The resulting double exposed hologram is a contour hologram from which a holographic contour image or map of the object may be reconstructed.

As noted earlier, the object 12 must remain stationary within a fraction of a wavelength of the coherent light between the two exposures of the recording medium 30. Movement of the reflector 46 between its active and inactive positions may be effected by any suitable means at a relatively high speed to generate the two light frequencies in rapid succession and thereby minimize the possibility of movement of the object between exposures.

It will be apparent to those versed in the art that the present concept of controlling and rapidly changing the coherent light output frequency and wavelength may be utilized with a variety of lasing media, such as those mentioned in the earlier referenced patents.

The particular laser oscillator shown has a pink ruby lasing medium 38 with chromium ions dissolved, with a concentration on the order of 0.03 percent to 0.05 percent in a sapphire ($Al_2O_3$) host. Ruby both fluoresence and absorbs in the red end of the visible spectrum. The fluorescence and resonance absorption is a doublet of 15 Angstroms separation. The longer wavelength line is now known as the $R_1$ line while the shorter wavelength line is the $R_2$ line. The red fluorescent doublet is a byproduct of the absorption of light in the blue and green portions of the spectra. The fluorescence is extremely efficient ($\approx 0.8$), with the result that nearly every excited atom decays via fluorescence.

The fluorescent lifetime of ruby is 3.8 milliseconds. The property of simultaneous absorption and fluorescence at the same wavelength classifies ruby as a three-level laser material.

Ruby laser crystals absorb resonance or fluorescence light according to the following expression, namely, $$I_t = I_o \exp (N_1 - N_2)\sigma l,$$

where
 $I_t$ is the intensity of light transmitted through a crystal of thickness $l$, (watts)
 $I_o$ is the intensity of light incident on the crystal, (watts)
 $N_1$ is the number of unexcited or ground state atoms per unit volume, (unexcited atoms per unit volume)
 $N_2$ is the number of excited ($R_1$ or $R_2$ atoms) per unit volume, (excited atoms per unit volume)
 $\sigma$ is the cross-section for the absorption and emission of radiation;
and
 $l$ is the physical length of the sample.

In the unexcited state, all of the atoms of a crystal are in the ground state and the crystal is absorptive of light resonant to either the $R_1$ or $R_2$ transitions. Under high excitation due to an intense flash of blue-green light, the number of atoms in the upper state can briefly exceed the number in the lower state. The crystal is no longer an absorber of resonance radiation, but instead has gain. When an optical resonator is added, the combination oscillates at the longitudinal modes of the resonator.

Ruby lasers having an optical resonator with conventional broadband reflectors normally oscillate only at wavelengths permitted by the $R_1$ fluorescent line width. Oscillation at the $R_2$ wavelength does not normally occur. However, oscillation at the $R_2$ wavelength can be achieved by thwarting the gain at the $R_1$ wavelength. The reason why rubies normally oscillate at the wavelength of the $R_1$ energy level is that this level is below the $R_2$ level and is more densely populated (by thermodynamic equilibrium arguments). The $R_2$ and $R_1$ levels are connected so that $R_1$ population is maintained from the $R_2$ level.

The rear end reflectors 44, 46 are chosen to select the $R_1$ and $R_2$ transitions or wavelengths, respectively, of the ruby 38. In the particular laser oscillator illustrated in FIG. 1, for example, reflector 44 is a broadband reflector, such as a conventional 99 percent rear cavity reflector. From the earlier discussion concerning the lasing characteristics of a ruby, it will be understood that reflector 44, when exposed to reflect the laser beam, selects the $R_1$ transition or wavelength of the ruby and the laser oscillator generates coherent light of the $R_1$ wavelength.

Reflector 46 is a dielectric coated spike filter or bandpass filter with a non-reflecting backing 48, such as a sheet of black paper. This filter is designed to reflect substantially only light of the $R_2$ wavelength and to transmit other wavelengths which are then absorbed by the backing 48. Accordingly, reflector 46, when located in active position to reflect the laser beam, selects the $R_2$ transition or wavelength of the ruby 38 and the laser oscillator generates coherent light of the $R_2$ wavelength.

The $R_2$ transition or wavelength may be selected by $R_2$ selective reflectors other than a spike or bandpass filter. For example, the $R_2$ reflector may be a tuned Fabry-Perot etalon which reflects at the $R_2$ wavelength only. Such as etalon may be constructed from a pair of standard dielectric coated laser reflectors with broad band reflecting surfaces. From the well known Fabry-Perot resonance condition $$m\lambda = 2b$$

where $T$ is the distance or optical thickness between reflecting surfaces, $m$ is an integer; and $\lambda$ is the light wavelength it follows that the separation of the reflecting surfaces can be chosen so that one wavelength $\lambda_2$ is intermediate the resonance of another wavelength $\lambda_1$.

The wavelength separation between the $\lambda_1$ resonances of the etalon is $$\Delta\lambda_1 = (-\lambda^2/2T)$$

where $T$ is the separation.

For the $\lambda_2$ wavelength to be intermediate, these two resonances $$\lambda_1 = \lambda_2 + (\Delta\lambda_1 12_2)$$
$$= \lambda_2 - (\lambda_1/4T)$$

Solving give a surface space of
$T = [(\lambda_1^2)/4(\lambda_1-\lambda_2)] \cong (\lambda^2/4\Delta\lambda)$
which puts the $\lambda_2$ resonances intermediate the $\lambda_1$ resonances. Substituting the room temperature wavelength values for the $R_1$ and $R_2$ wavelengths gives a surface separation L $L = [0.48 /4(15)]$ CM = 80 microns
$= 0.00314$ inches As noted earlier, maximum contouring accuracy requires the proper reference beam angle for each light wavelength used to record the contour hologram. The relationship between wavelength and reference beam angle is well known to those versed in the holographic contouring art and need not be explained here. Suffice it to say that if the difference in the light frequencies used for recording a contour hologram is sufficiently great to require adjustment of the reference beam angle between successive exposures of the recording medium 30 at the two frequencies, such adjustment may be effected in any convenient way. In the particular holographic contouring apparatus illustrated, a reference beam angle adjustment is necessary owing to the difference between the $R_1$ and $R_2$ wavelengths used. This adjustment is made by adjusting mirror 28, as shown.

Holographic contouring apparatus according to the invention was constructed and successfully operated to produce contour holograms of an object and then reconstruct holographic contour maps of the object. The laser oscillator of one apparatus employed as the $R_2$ reflector 46 a spike filter marketed by the Heliotek Division of the Textron Corporation. This filter reflects 30 percent of the light of 0.6943 micron ($R_1$) wavelength and 95 percent of the light of 0.6929 ($R_2$) wavelength. Another apparatus used a laser oscillator with a tuned etalon as the $R_2$ reflector. This reflector or etalon was tuned in the manner explained earlier.

What is claimed as new in support of Letters Patent is:

1. A multifrequency laser oscillator comprising:
an active lasing medium capable of being pumped to a population inversion which creates light emission at first and second optical frequencies;
means for pumping said lasing medium to said population inversion to produce light emission at said two optical frequencies;
an optical cavity containing said lasing medium including an output reflector at the front end of said cavity, a first reflector at the rear end of said cavity for selecting said first frequency, and a second reflector at the rear cavity end for selecting said second frequency; and
at least one rear end reflector being movable between an active position where it reflects the laser beam and an inactive position where said beam is reflected by the other rear end reflector.

2. A laser oscillator according to claim 1 wherein:
said lasing medium is a ruby; and
said frequencies correspond to the $R_1$ and $R_2$ wavelengths of the resonant fluorescence of the ruby.

3. A laser oscillator according to claim 2 wherein:
one of said rear end reflectors is a broadband reflector and the other rear end reflector reflects substantially only light of said $R_2$ wavelength.

4. A laser oscillator according to claim 1 wherein:
said lasing medium is a ruby;
said frequencies correspond to the $R_1$ and $R_2$ wavelengths of the resonant fluorescence of the ruby; and
one of said rear end reflectors is a broadband reflector and the other rear end reflector reflects substantially only light of said $R_2$ wavelength.

5. A laser oscillator according to claim 1 wherein:
said second rear end reflector is stationary in the path of said beam, and said first rear end reflector is movable to and from a position in said beam path between said medium and said second reflector.

6. A laser oscillator according to claim 1 wherein:
each of said rear end reflectors are movable into and from the path of said beam.

* * * * *